United States Patent [19]
Dworak

[11] 3,896,049
[45] July 22, 1975

[54] METHOD OF FORMING CO-PRECIPITATED MATERIAL

[75] Inventor: Dennis D. Dworak, Plano, Tex.

[73] Assignee: Atlantic Richfield Company, Los Angeles, Calif.

[22] Filed: Dec. 3, 1973

[21] Appl. No.: 421,140

[52] U.S. Cl. .............................................. 252/466 J
[51] Int. Cl. .............................................. B01j 11/08
[58] Field of Search ................................. 252/466 J

[56] References Cited
UNITED STATES PATENTS

| | | | |
|---|---|---|---|
| 2,270,504 | 1/1942 | Burk et al. ....................... | 252/466 J |
| 2,296,405 | 9/1942 | Scheuermann et al. ...... | 252/466 J X |
| 2,449,295 | 9/1948 | Gutzeit............................. | 252/466 J |
| 2,550,442 | 4/1951 | Beck et al. ..................... | 252/466 J X |
| 3,320,182 | 5/1967 | Taylor et al...................... | 252/466 J |

*Primary Examiner*—Helen M. S. Sneed
*Attorney, Agent, or Firm*—James C. Fails, Wofford, Felsman, Fails & Zobal

[57] ABSTRACT

A method of forming an improved material having a matrix of oxidized, high surface area, uniformly dispersed active and carrier materials that is useful, not only as a catalyst, but also as an adsorbent for adsorbing a high concentration of contaminants, such as arsenic and selenium, deeply within its matrix and still retain its structural integrity characterized by the steps of preparing a single solution containing uniformly distributed water-soluble salts of the active and carrier cations; reacting them with a basic solution, such as ammonium hydroxide, to form insoluble and uniformly dispersed co-precipitates; drying the co-precipitates; removing the undesirable by-product; comminuting dried co-precipitates; forming the comminuted co-precipitates into an aqueous slurry; forming the slurry into particles of the desired size and shape; drying the particles; and calcining in an oxidizing atmosphere the dried particles to incorporate oxygen atoms into the matrix to achieve the requisite co-precipitated material, hardness and surface area. Also disclosed are preferred additional method steps, compositions and uses.

8 Claims, No Drawings

METHOD OF FORMING CO-PRECIPITATED MATERIAL

BACKGROUND OF THE INVENTION

1. Field of the Invention:

This invention relates to a method of forming a chemically active material. More particularly, this invention relates to a method of forming a shift catalyst. This invention also relates to forming a solid matrix material which is active for removing contaminates from a fluid to be treated.

2. Description of the Prior Art:

A wide variety of different catalysts have been known in the prior art. One group of catalysts that have proved particularly useful is the so-called shift catalysts. These catalysts are typified by the iron shift catalysts. For example, the iron shift catalyst is employed for converting carbon monoxide to carbon dioxide and leaving hydrogen in order to enrich coal gas or the like to form a synthesis gas from which methanol can be synthesized. In addition, these shift catalysts have many other uses. For example, as described in U.S. Pat. No. 2,764,525, the alumina and iron oxide catalysts can be employed to remove vanadium or sodium from petroleum and petroleum products. In addition, co-workers Donald K. Wunderlich and Gary A. Myers have discovered that synthetic crudes can be treated with materials, including iron oxide, to remove catalyst-poisoning impurities, or contaminants, such as, arsenic and selenium. Such removal prevents poisoning of the expensive catalyst used in further refining, including hydrogenating, the synthetic crude or products thereof. Typical of the synthetic crudes are the hydrogen deficient hydrocarbons, such as shale oil, liquefied coal or tar, and the like. One of the problems that has been experienced with the catalyst forms of the prior art has been the lack of adequate structural integrity. More specifically, structures of the prior art have had a tendency to retain the removed contaminant essentially at the surface of the structure. This frequently has resulted in a physical disruption of the surface layer, with attendant spalling or flaking. As the spalling and flaking increased, the flow passageways became blocked and large pressure drops were experienced across beds of the catalyst, particularly if the removal of the contaminant was carried to too great an extent. In fact, if the pressure drop became too high, the entire bed could be disrupted, ruining certain products by carry-over of the spalled and flaked material.

Thus, insofar as I am aware, the prior art has not provided an economical, structurally strong material that dispersed or diffused a removed contaminant sufficiently so that it maintained its structural integrity even in the presence of high concentrations of a retained contaminant.

SUMMARY OF THE INVENTION

Accordingly, it is an object of this invention to provide a method of forming an improved material that obviates the disadvantages of the prior art methods and forms a material that has a large surface area that will remove impurities, or contaminants, and disperse the removed and retained contaminants; and that retains its structural integrity even in the face of high concentrations of retained contaminant.

Another object of this invention is to provide a method of forming the improved material by a simplified multistep process in which contaminating by-products are removed during the heating operation, without requiring additional washing and filtering steps.

These and other objects will become apparent from the descriptive matter hereinafter.

The foregoing objects are achieved and the improved material is formed by the method which includes the following steps.

1. Water-soluble salts of the active cation and the carrier cation are dissolved in respective solutions, the solutions are admixed and poured with stirring into a stoichiometric excess of a basic solution that contains an anion that forms an insoluble reaction compound or compounds with the active and carrier cations. The insoluble reaction compound or compounds are formed as co-precipitates.

2. The liquid is decanted from the co-precipitate after centrifuging.

3. The solid co-precipitate is dried at slightly above the boiling point of water.

4. The dried precipitate is ground to a fine powder.

5. The powder is admixed with water to form a thick slurry. The slurry is worked and kneaded to provide a consistency sufficient for extrusion.

6. The slurry is extruded into the desired size and shape and the extrusions are dried to remove the water.

7. Finally, the pellets are calcined at a suitable temperature to achieve the necessary dehydration, hardness and surface area to form an effective chemically active material.

Preferably, ammonium hydroxide is employed as the basic solution; and the water-soluble salt contains as its anion an anion that will combine with the ammonium cation to form a by-product that can be removed by heating to a temperature less than the calcining temperature; and the dried co-precipitate is heated to a suitable temperature less than the calcining temperature to remove the ammonium anion by-product so that it is removed without separate filtering and washing steps.

DESCRIPTION OF PREFERRED EMBODIMENTS

The water-soluble salt of the cation of the active component may be designated generically without reference to valence as XM, where X is a cation selected from the group consisting of iron (ferrous or ferric) and cobalt (cobaltous or cobaltic); and M is an anion selected from the group consisting of nitrate and halide ($Cl^-$, $Br^-$, $I^-$, and $F^-$). For example, with reference to valence, $XM_3$ can be ferric nitrate, $Fe(NO_3)_3.9H_2O$.

The water-soluble salt of the carrier cation may be designated generically without reference to valence as YM, where Y is a cation whose hydroxide salt can be calcined to give a high surface area catalyst, and M is the same as described hereinbefore for the active component. Y is aluminum. For example, with reference to valence, $YM_3$ can be $Al(Cl)_3$.

The basic solution employs a base that will form insoluble precipitates with the cations X and Y. The base may be designated generically without reference to valence as ZN, where Z is a cation selected from the group consisting of sodium, potassium and ammonium; and N is an anion selected from the group consisting of carbonate ($CO_3^=$) and hydroxide ($OH^-$). The sodium and potassium cations require a separate step of washing to remove the ZM by-product. The carbonate co-precipitate $X_2(CO_3)_3$ and $Y_2(CO_3)_3$ is slightly soluble. In this preferred embodiment, the base also employs a cation that will react with the anion M to form a byproduct that is removable by heating, either decomposing or subliming to gaseous form. Accordingly, ammonium hydroxide is employed as the preferred base with which to react the solutions formed by the salts $XM_3$ and $YM_3$. The equation of the reaction at this stage is probably given by Equation I.

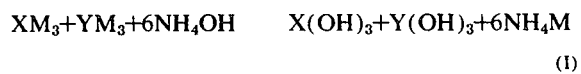

$$XM_3 + YM_3 + 6NH_4OH \quad X(OH)_3 + Y(OH)_3 + 6NH_4M$$

(I)

The liquid containing insoluble hydroxides is centrifuged and the hydroxides are collected as a co-precipitate. The co-precipitate is then dried at a temperature slightly above the boiling point of water. When free of water, the temperature is raised to the range of 300° to 700° Fahrenheit (°F). For example, if the nitrate salt is employed, the ammonium nitrate will be removed at about 325°F. If the chloride salt is employed, the ammonium chloride requires about 335° Centigrade (°C), or 655°F to sublime. Accordingly, it can be seen that the nitrate salts are preferred, since the ammonium nitrate can be removed at a lower temperature.

The dried precipitate is comminuted, or ground, to a fine powder. For example, it is ground sufficiently that it will pass through a 300 standard mesh screen. The fine powder is then mixed with water to form a thick slurry. The slurry must be worked and kneaded to provide the necessary consistency for extrusion. The thick slurry is then extruded to form extrusions of the desired size and shape. While extrusions on the order of ¼ inch in diameter and ¼ inch long may be employed, I have found it preferable to employ smaller extrusions having a diameter of about ⅛ inch and a length from ⅛ to ¼ inch.

The extrusions are then dried again at a temperature slightly above the boiling point of water. The dried extrusions are then calcined at a suitable temperature within the range of 800° to 1,500°F to form the desired high internal surface area, structurally strong, co-precipitated material of this invention. The calcining apparently converts the hydroxides to the high surface area active oxides.

The final co-precipitated material has been examined by x-ray spectroscopy and the like to try to delineate the character of its lattice. The resulting crystallograms indicate the final form of a 50 mol percent aluminum hydroxide co-precipitate with ferric hydroxide to be $Fe_2Al_2O_6$. In other words, in the co-precipitated material it is no longer possible to delineate the specific structure of the iron oxide or the aluminum oxide in the matrix. It is believed that this is partly responsible for the unusually good characteristics of maintaining its structural integrity, as well as affording a pore distribution that allows access to all portions of the lattice by the contaminants in the fluid to be treated.

The material is then useful for many applications. For example, as indicated hereinbefore, the material may be employed as a shift catalyst and form a shift catalyst of superior structural integrity and performance. This is particularly true where X is iron. Moreover, the iron oxide or cobalt oxide may be employed to remove contaminating materials, such as arsenic and selenium, from hydrocarbonaceous fluids such as synthetic crudes or synthetic crude fractions. The resulting co-precipitated material will remove the contaminants and diffuse the cations in its matrix. Moreover, the co-precipitated material retains its structural integrity in use. The reasons for this retention of structural integrity are not completely clear. It is theorized, however, and this theory is to be taken by way of explanation and not by way of limitation, since the material works regardless of whether or not the theory is correct, that the larger arsenic molecule may be taken into its lattice without disruption of the lattice. On the contrary, in certain conventional catalysts, when the iron oxide is finally converted to iron arsenide, the arsenide physically disrupts the surface layer and causes the spalling and flaking. In any event, it has been proven that when the iron oxide is converted to iron sulfide and the iron sulfide used to remove arsenic from synthetic crudes, the arsenic is deposited in a surface layer. Specifically, electron microprobe scans show the absence of sulfur in the surface layer and a high concentration of arsenic in the surface layer. The electron microprobe scans also show that interiorly of a conventional catalyst, the sulfur remains high whereas there is substantially no arsenic on the interior regions of the catalyst. With the improved co-precipitated material of this invention, the arsenic contaminant is more diffuse, e.g., penetrates deeper, in that material's lattice. Moreover, there is no flaking and spalling at concentrations of the contaminant that are high enough to have effected spalling and flaking in the conventional catalysts.

The relative proportions of the salts are chosen such that the carrier co-precipitate, such as the aluminum hydroxide, is in a proportion of at least 25 percent on a mol basis, in order to give adequate structural strength and integrity, the remainder being essentially active co-precipitate. On the other hand, no more than about 95 percent, on a mol basis, of the carrier co-precipitate is employed, since the active portion, e.g., ferric hydroxide or cobalt-hydroxide, of the final co-precipitate could require an inordinately large bed of final co-precipitate material to effect the desired quantitative removal of contaminant or an inordinately short change-out period for that material. A useful proportion has been found to have the carrier present in a proportion of about 50 percent on a mol basis of the co-precipitated material in order to attain high structural integrity, yet have a high enough proportion of the active material that feasibly sized beds of co-precipitated material can be employed.

The following example illustrates a particularly preferred embodiment of this invention.

EXAMPLE

This example illustrates the formation of a co-precipitated catalyst of alumina and ferric oxide in about equal mol proportions. Seventy grams of aluminum nitrate, $Al(NO_3)_3 \cdot 9H_2O$ and 80 grams of ferric nitrate, $Fe(NO_3)_3 \cdot 9H_2O$, were dissolved in 300 milliliters of water. A solution of 160 milliliters of 58 percent ammonium hydroxide and 100 milliliters of water was prepared. The salt solution comprising the mixture of the aluminum nitrate and the ferric nitrate was poured into the ammonium hydroxide solution while stirring constantly. The resulting admixture, including the insoluble aluminum and ferric hydroxides were centrifuged and the liquid decanted therefrom. The co-precipitate of the aluminum and iron hydroxides was dried at 230°F for 8 hours. The dried co-precipitates were then heated to 325°F for 8 hours in order to drive off the ammonium nitrate.

The final dried co-precipitate was ground in a ball mill for ten minutes to form a fine powder. The fine powder was mixed with water until a thick slurry of the desired consistency for extrusion was achieved. The slurry was worked and kneaded and finally extruded through a die having a diameter of ⅛ inch.

The extrusions were dried at 230°F for 4 hours. The dried extrusions were then calcined at 1,050°F for 1 hour. The resulting extrusions had an internal surface area of approximately 160 square meters per gram. The extrusions theoretically formed a material containing one mol of aluminum oxide per mol of iron oxide, but was indicated by x-ray spectroscopy to have the structure $Al_2Fe_2O_6$ delineated hereinbefore.

The material was employed to remove arsenic from a liquid synthetic crude oil flowed therepast. It was found that at least 8 to 10 percent by weight of arsenic could be removed and retained, based on the weight of the co-precipitated material. This is equivalent to a weight of about 20 percent based on iron oxide alone. When using a conventional ferric oxide shift catalyst, when more than about 15 percent by weight of arsenic was removed and retained, it was found that the catalyst lost its structural integrity and began to spall and flake, eventually effecting unduly large pressure drops through the catalyst bed employed as a guard chamber upstream of hydrogenation chambers or the like.

Having thus described the invention, it will be understood that such description has been given by way of illustration and example and not by way of limitation. The claims define the scope of the invention.

What is claimed is:

1. A method of forming an improved material having a matrix including oxidized, uniformly dispersed active and carrier materials so as to be useful, not only as a catalyst, but also as an adsorbent to adsorb from a liquid a high concentration of contaminants selected from the group consisting of arsenic and selenium deeply within its matrix and retain its structural integrity comprising the steps of:

a. preparing a first single aqueous solution containing uniformly distributed throughout dissolved water-soluble salts XM and YM of an active cation and of a carrier cation, respectively:
      where X is a cation of an active material and is selected from the group consisting of iron and cobalt;
      where Y is a cation of a structurally adequate carrier forming a high surface area material and is aluminum; and
      where M is an anion of a water-soluble salt of X and Y and is selected from the group consisting of nitrate and halide;

b. reacting said dissolved salts in said first single aqueous solution with a basic ZN in aqueous solution to form insoluble co-precipitates XN and YN and a by-product ZM; said ZN being present in an amount greater than the stoichiometric amount required for complete reaction in order to form uniformly dispersed insoluble co-precipitates:
      where Z is a cation forming a water-soluble basic material with N and forming a reaction product with the anion M that can be readily removed from said insoluble co-precipitates; and
      where N is an anion forming a water-soluble basic material with Z and forming insoluble co-precipitates with X and Y and is selected from the group consisting of carbonate and hydroxide;

c. drying said uniformly dispersed co-precipitates to remove the water therefrom;

d. removing said by-product from said uniformly dispersed co-precipitates;

e. comminuting the dried uniformly dispersed co-precipitates;

f. forming the comminuted uniformly dispersed co-precipitates into an aqueous slurry;

g. forming said slurry into particles of desired size and shape;

h. drying said particles; and i. calcining in the presence of an oxidizing atmosphere the dried particles to incorporate oxygen atoms into the matrix and to achieve the requisite co-precipitated uniformly dispersed active and carrier material, hardness and surface area.

2. The method of claim 1 wherein the cation Z is ammonium and the anion M forms salts with the ammonium that are removable by heating at a temperature no higher than the calcining temperature of the co-precipitates to form the co-precipitated material, and the co-precipitates are heated to remove the by-product ZM.

3. The method of claim 2 wherein M is a nitrate and the step c. of removing the product ZM comprises heating the co-precipitates to approximately 325°F to remove the ammonium nitrate.

4. The method of claim 1 wherein X is cobalt in the form of cobaltic cation.

5. The method of claim 1 wherein X is iron in the form of ferric cation.

6. The method of claim 1 wherein the carrier portion is from about 25 to about 95 mol percent, the remainder being essentially the active portion.

7. The method of claim 6 wherein the carrier portion is about 50 mol percent, the remainder being essentially the active portion.

8. The method of claim 1 wherein said co-precipitated material is reacted with a sulfur-containing material to replace the oxygen in the matrix with sulfur.

* * * * *

UNITED STATES PATENT OFFICE
CERTIFICATE OF CORRECTION

PATENT NO. : 3,896,049
DATED : July 22, 1975
INVENTOR(S) : Dennis D. Dworak

It is certified that error appears in the above-identified patent and that said Letters Patent are hereby corrected as shown below:

Column 3, line 10, after "$XM_3+YM_3+6NH_4OH$", insert -- $\longrightarrow$ --;

Column 6, line 40, delete "ZM" and substitute therefor --ammonium nitrate--.

Signed and Sealed this thirtieth Day of September 1975

[SEAL]

Attest:

RUTH C. MASON
*Attesting Officer*

C. MARSHALL DANN
*Commissioner of Patents and Trademarks*